United States Patent
Nilsson (10) Patent No.: US 9,441,523 B2
(45) Date of Patent: Sep. 13, 2016

(54) CHANNEL SYSTEM WITH INTERNAL FLOW DIRECTOR AND TURBULENCE GENERATOR

(76) Inventor: Sven Melker Nilsson, Kållered (SE)

( * ) Notice: Subject to any disclaimer, the term of this patent is extended or adjusted under 35 U.S.C. 154(b) by 1057 days.

(21) Appl. No.: 12/736,481

(22) PCT Filed: Apr. 18, 2008

(86) PCT No.: PCT/SE2008/000282
§ 371 (c)(1),
(2), (4) Date: Oct. 13, 2010

(87) PCT Pub. No.: WO2009/128750
PCT Pub. Date: Oct. 22, 2009

(65) Prior Publication Data
US 2011/0030829 A1 Feb. 10, 2011

(51) Int. Cl.
*F28D 17/00* (2006.01)
*F01N 3/28* (2006.01)
*B01J 35/04* (2006.01)
(Continued)

(52) U.S. Cl.
CPC ............. *F01N 3/2821* (2013.01); *B01J 35/04* (2013.01); *F28D 7/16* (2013.01); *F28D 9/0025* (2013.01); *F28F 1/04* (2013.01); *F28F 1/08* (2013.01); *F28F 13/08* (2013.01); *F01N 2330/323* (2013.01); *F01N 2330/38* (2013.01)

(58) Field of Classification Search
CPC ............. F01N 2330/38; F01N 3/2821; F01N 2330/323; F28D 7/16; F28D 9/0025; F28F 1/04; F28F 1/08; F25F 13/08
USPC .................................................... 165/10, 166
See application file for complete search history.

(56) References Cited

U.S. PATENT DOCUMENTS 2,006,649 A 7/1935 Modine
2,011,756 A 11/1935 Diamant
(Continued)

FOREIGN PATENT DOCUMENTS

CN 2296989 Y 11/1998
CN 1204972 A 1/1999
(Continued)

OTHER PUBLICATIONS

Decision on Grant dated Jun. 28, 2012, issued in corresponding Russian Application No. 2010146941/06(067801).
(Continued)

*Primary Examiner* — Orlando Aviles Bosques
(74) *Attorney, Agent, or Firm* — Harness, Dickey & Pierce, P.L.C.

(57) ABSTRACT

A channel system is disclosed for optimizing the relation between pressure drop and heat, moisture and/or mass transfer of fluids flowing through the system. In at least one embodiment, the channel system includes at least one channel having at least one channel wall and at least one flow director having a height, the flow director extending in a fluid flow direction and transversely to the channel. It further includes an upstream portion, a downstream portion and an intermediate portion between the upstream and downstream portions, the upstream portion deviating, in the fluid flow direction, from the channel wall inwardly into the channel, and the downstream portion returning, in the fluid flow direction, towards the channel wall, wherein a transition between the intermediate portion and the downstream portion is curved with a radius.

23 Claims, 4 Drawing Sheets (51) Int. Cl.
  *F28D 7/16* (2006.01)
  *F28D 9/00* (2006.01)
  *F28F 1/04* (2006.01)
  *F28F 1/08* (2006.01)
  *F28F 13/08* (2006.01)

(56) References Cited

U.S. PATENT DOCUMENTS

| | | | |
|---|---|---|---|
| 3,151,675 | A | 10/1964 | Lysholm |
| 4,152,302 | A | 5/1979 | Nonnenmann et al. |
| 4,230,179 | A | 10/1980 | Uehara et al. |
| 4,314,587 | A | 2/1982 | Hackett |
| 4,809,415 | A | 3/1989 | Okayama et al. |
| 5,157,010 | A | 10/1992 | Maus et al. |
| 5,177,960 | A | 1/1993 | Hitachi et al. |
| 5,309,637 | A | 5/1994 | Moriarty |
| 6,187,274 | B1 | 2/2001 | Nilsson |
| 6,422,306 | B1 * | 7/2002 | Tomlinson et al. ........... 165/170 |
| 6,972,009 | B1 | 12/2005 | Stromberg et al. |
| 7,096,933 | B1 | 8/2006 | Zia et al. |
| 2002/0040777 | A1 | 4/2002 | Tomlinson et al. |
| 2007/0125528 | A1 | 6/2007 | Fakheri |

FOREIGN PATENT DOCUMENTS

| | | |
|---|---|---|
| CN | 1432123 A | 7/2003 |
| DE | 37 44265 A1 | 7/1989 |
| EP | 0 298 943 | 1/1989 |
| EP | 0 869 844 | 3/2002 |
| EP | 2 472 210 A1 | 7/2012 |
| GB | 2207232 A | 1/1989 |
| JP | 6021890 U | 2/1985 |
| JP | 2002-048491 A | 2/2002 |
| JP | 2004-503739 | 2/2004 |
| SE | 461 018 | 12/1989 |
| SE | 515 132 | 6/2001 |
| SU | 591684 | 2/1978 |
| SU | 1462076 A1 | 2/1989 |
| WO | WO 97/21489 A1 | 6/1997 |
| WO | WO 01/96803 | 12/2001 |
| WO | WO 2007/078240 | 7/2007 |
| WO | WO 2007/078240 A1 | 7/2007 |
| WO | WO 2009/128750 A1 | 10/2009 |

OTHER PUBLICATIONS

Chinese Office Action dated Aug. 24, 2011 and English translation thereof.
Office Action dated Sep. 10, 2012, issued in corresponding Japanese Patent Application No. 2011-504954.
Translation of Chinese Office Action for corresponding Chinese application dated Mar. 11, 2013.
Supplementary European Search Report for corresponding PCT/SE 2009050880 dated Mar. 14, 2013.
International Search Report.
International-Type Search Report.
U.S. Office Action dated Apr. 22, 2014 for co-pending U.S. Appl. No. 12/737,505.
Korean Office Action dated Mar. 19, 2014 for corresponding Korean Application No. 10-2010-7025509.
Supplementary European Search Report for corresponding PCT/SE 2008000282 dated Nov. 5, 2013.
International Search Report (PCT/ISA/210) dated Nov. 3, 2009 for corresponding International Application No. PCT/SE2009/050880.
Written Opinion of the International Searching Authority (PCT/ISA/237) dated Nov. 3, 2009 for corresponding International Application No. PCT/SE2009/050880.
English translation of Chinese Office Action dated Feb. 8, 2014 for corresponding Chinese Application No. 201210472701.6.
English translation of Chinese Office Action dated Jan. 22, 2014 for corresponding Chinese Application No. 201210473658.5.
English translation of Chinese Office Action dated Feb. 8, 2014 for corresponding Chinese Application No. 201210473338.X.
English Summary of Russian Office Action dated Apr. 2, 2012 for corresponding Russian Application No. 2010146941.
English translation of Japanese Office Action dated Sep. 10, 2012 for corresponding Japanese Application No. 2011-504954.
U.S. Office Action dated Sep. 23, 2014 for co-pending U.S. Appl. No. 12/737,505.
English translation of Chinese Office Action dated Sep. 4, 2014 for corresponding Chinese Application No. 201210473658.5.
English translation of Chinese Office Action dated Sep. 16, 2014 for corresponding Chinese Application No. 201210473338.X.
English translation of pp. 75-78 of reference book "Transmission Principle," edited by Zesheng Ji et al., published by Harbin Institute of Technology Press, Dec. 2002.
English translation of Japanese Office Action dated Jan. 13, 2015 for corresponding JP Application No. 2013-220603.
English translation of Korean Office Action Summary dated Jan. 27, 2015 for corresponding KR Application No. 10-2014-7013357.
U.S. Office Action dated May 2, 2015 for co-pending U.S. Appl. No. 12/737,505.
European Office Action dated Jan. 20, 2016 for corresponding EP Application No. 08741856.2.
U.S. Office Action dated Jan. 5, 2016 for co-pending U.S. Appl. No. 12/737,505.
English Summary of Office Action for corresponding Russian Patent Application No. 2010146941 dated Apr. 2, 2012.
European Office Action dated Jun. 16, 2016 issued in European Application No. 08741856.2.

* cited by examiner

CHANNEL SYSTEM WITH INTERNAL FLOW DIRECTOR AND TURBULENCE GENERATOR

FIELD OF THE INVENTION

The present invention relates to a channel system for optimising the relation between pressure drop and heat, moisture and/or mass transfer of fluids flowing through said system, said channel system comprising at least one channel having at least one channel wall and at least one flow director having a predetermined height, said flow director extending in a fluid flow direction and transversely to said channel, and comprising an upstream portion, a downstream portion and an intermediate portion between said upstream and downstream portions, said upstream portion deviating, in said fluid flow direction, from said channel wall inwardly into said channel, and said downstream portion returning, in said fluid flow direction, towards said channel wall, wherein a transition between said intermediate portion and said downstream portion is curved with a predetermined radius.

BACKGROUND ART

Heat exchangers/catalysts are often a channel system having a body, which is formed with a large number of juxtaposed small channels through which flows a fluid or fluid mixture, which, for example, is to be converted. The channel systems are made of different materials, such as ceramic materials or metals, for example stainless steel or aluminium.

Channel systems made of ceramic materials has a channel cross-section, which usually is rectangular or polygonal, for example hexagonal. The channel system is made by extrusion, which means that the cross-section of the channels is the same along the entire length of the channel, and the channel walls will be smooth and even.

In the manufacture of channel bodies of metals, a corrugated strip and a flat strip are usually wound about a spool. This results in channel cross-sections, which are triangular or trapezoidal. Most channel systems of metals that are available on the market have channels of the same cross-section along their entire length and have, like ceramic channel bodies, smooth and even channel walls. Both these types may be coated with a coating, for example in a catalyst with a catalytically active material.

What is most important in the context is the heat, moisture and/or mass transfer between the fluid or fluid mixture flowing through the channels and the channel walls in the channel system.

In channel systems of the above type, used with for example internal combustion engines in vehicles or in the industry, with relatively small cross-sections of the channels and fluid velocities commonly used in these contexts, the fluid flows in relatively regular layers along the channels. The flow thus is essentially laminar. Only along a short distance at the inlet of the channels, a certain flow occurs transversely to the channel walls.

As is generally known in the art, a boundary layer is formed in laminar fluid flow next to the channel walls, where the velocity is essentially zero. This boundary layer significantly reduces the mass transfer coefficient, above all in the case of what is referred as fully developed flow, in which the heat, moisture and/or mass transfer occurs mainly by diffusion, which is relatively slow. The mass transfer coefficient is a measure of the mass transfer rate and should be great so as to obtain high efficiency of the heat exchange and/or the catalytic conversion. To increase the mass transfer coefficient, the fluid must be made to flow toward the surface of the channel side so that the boundary layers are reduced and the flow transfer from one layer to another is increased. This may take place by what is referred to as turbulent flow. In smooth and even channels, the laminar flow turns turbulent when the Reynolds number reaches values above approx. 2000. If one wishes to reach Reynolds number of this magnitude in the channels in the channel systems that are here involved, considerably higher fluid velocities are required than is normal in these contexts. At the low Reynolds numbers that are involved in channel systems of the type described above, it is therefore necessary to create turbulence by artificial means, such as by arranging special flow directors in the channels.

U.S. Pat. No. 4,152,302 discloses a catalyst with channels, in which flow directors are arranged in the form of transverse metal flaps punched from the strip. A catalyst with flow directors significantly increases the heat, moisture and/or mass transfer. However, at the same time also the pressure drop increases dramatically. The effects of the pressure drop increase have, however, been found to be greater than the effects of the increased heat, moisture and/or mass transfer. The pressure drop depends on, inter alia, the configuration, dimension and geometry of the flow directors. However, it is generally known that said types of flow director produce an excessive pressure drop, and therefore they have not been used commercially to any considerable extent.

EP 0 869 844 discloses turbulence generators extending transversely to the ducts of the catalyst or heat/moisture exchanger to obtain an improved ratio of pressure drop to heat, moisture and/or mass transfer.

WO 2007/078240 discloses flow converters extending transversely to the channels. However, further improvements of the ratio of pressure drop to heat, moisture and/or mass transfer is always a desire for the manufacturer of such systems.

SUMMARY OF THE INVENTION

The object of the present invention is to provide a channel system, in which the ratio of pressure drop to heat, moisture and/or mass transfer is further improved.

The above object is achieved with a channel system which has the features defined in the appended claims.

A channel system according to the present invention for optimising the relation between pressure drop and heat, moisture and/or mass transfer of fluids flowing through the system comprises at least one channel having at least one channel wall and at least one flow director having a predetermined height. The flow director extends in a fluid flow direction and transversely to the channel. Further, the flow director comprises an upstream portion, a downstream portion and an intermediate portion between the upstream and downstream portions. The upstream portion deviates, in the fluid flow direction, from a channel wall inwardly into the channel, and the downstream portion returns, in the fluid flow direction, towards the channel wall wherein a transition between the intermediate portion and the downstream portion is curved with a predetermined radius. A curved transition between the intermediate portion and the downstream portion decreases the pressure drop and consequently further improve the ratio of pressure drop to heat, moisture and/or mass transfer of fluids flowing through a channel system. The decrease of pressure drop results in that the flow rate of the fluid through the channel system increases and consequently, the power requirement of the system decreases. This together with the increased or equal heat, moisture and/or mass transfer rate results in a more efficient system. Further, when coating is needed, a curve shaped surface is better, since the coating attachment to the underlying surface is increased and the coating through the whole channel may be more even. Less flash/burr is also created during the coating procedure. Flash/burr may be an accumulation of material at one spot, for example on a sharp edge. The accumulation, which may be thicker than the rest of the coating, may fall off when using it in high temperatures and through vibrations. Further, the flash increases the pressure drop substantially. A smoother surface do not only decrease the pressure drop, it also implies that the amount of precious metal needed decreases. Since the production cost is highly dependent on the needed amount of precious metal, the production cost is also reduced.

This radius improves the quality of the system by reducing the pressure drop but increases heat, moisture and/or mass transfer by guiding the fluid so that an eddy may be created, i.e. a controlled turbulent movement of the fluid, which is created due to the expanding cross-section. This turbulent movement is necessary to increase the heat, moisture and/or mass transfer rate. Preferably, the radius of the first transition between said intermediate portion and the downstream portion is $0.1*h_1$-$2.1*h_1$, preferably $0.35*h_1$-$2.1*h_1$, and more preferably $0.35*h_1$-$1.1*h_1$.

Suitably, the height of the flow director is larger than 0.35 times a height of the channel, taken in a similar direction as the first height. This height is necessary to have an effect on a major part of the fluid flowing through the channel, in order to mix the flow layers of the fluid and create the turbulent movement that increases the heat, moisture and/or mass transfer rate.

The intermediate portion of the flow director may comprise a flat portion, which is substantially parallel to one channel wall of the channel. The flat portion is utilised to direct the fluid in a direction parallel with the channel. This increases the velocity of the fluid in the direction parallel with the channel. The flat portion may also be needed in order to be able to manufacture the flow director. Advantageously, the length of the flat portion is, in the fluid flow direction, $0$-$2*H$, preferably $0$-$2*h_1$, and more preferably $0$-$1.0*h_1$.

Preferably, a transition between the downstream portion and the channel wall is curved with a predetermined radius. The radius of the transition between the downstream portion and the channel wall is $0.5*h_1$-$1.7*h_1$. The purpose of this radius is to prevent that a secondary eddy appears after the flow director. Such undesirable secondary eddy would increase the pressure drop without increasing heat, moisture and/or mass transfer. Hence, by avoiding such eddy the ratio of pressure drop to heat, moisture and/or mass transfer is increased. Thus, the pressure drop is further decreased, which in turn increases the efficiency of the channel system. In addition, this smooth transition prevents creation of flash/burr during the coating procedure. Therefore, this transition has, in relation to the creation of flash/burr, same advantages as the transition between the intermediate portion and the downstream portion as is discussed above.

Preferably, a third transition between the upstream portion and the intermediate portion is curved with a predetermined radius. This in order to smoothly direct the fluid towards a direction parallel to one side of the channel after passing the upstream portion. A smooth direction further decreases the pressure drop. The radius of the transition between the upstream portion and the intermediate portion may be $0.2*h_1$-$0.5*h_1$. In addition, this smooth transition prevents creation of flash/burr during the coating procedure. Therefore, this transition has, in relation to the creation of flash/burr, same advantages as the transition between the intermediate portion and the downstream portion as is discussed above. Alternatively, the radius of the transition between the upstream portion and the intermediate portion may be equal to the radius of the transition between the intermediate portion and the downstream portion. Equal radii are advantageous for applications in which the fluid may flow also in a direction opposite to the aforementioned fluid flow direction.

Advantageously, a transition between the channel wall of the channel and the upstream portion of the flow director is curved with a predetermined radius. This in order to smoothly direct the laminar fluid flow in a direction transverse the channel, which will increase the fluid velocity since the cross-section is being reduced. In addition, this smooth transition prevents creation of flash/burr during the coating procedure. Therefore, this transition has, in relation to the creation of flash/burr, same advantages as the transition between the intermediate portion and the downstream portion as is discussed above. Preferably, the radius of the transition between the channel wall of the channel and the upstream portion may be $0.2*h_1$-$0.5*h_1$.

Suitably, a flat portion of the upstream portion has a first angle of inclination in relation to a plane of the channel wall from which said upstream portion deviates. This in order to direct the fluid towards a direction which is not parallel with the channel, so that a turbulent flow may develop in order to increase heat, moisture and/or mass transfer. The first angle of inclination may be 10°-60°, and more preferably 30°-50°.

Preferably, a flat portion of the downstream portion has a second angle of inclination in relation to the plane of the channel wall to which said downstream portion returns. This in order to create an eddy, i.e. a controlled turbulent movement of the fluid, which is created due to the divergent cross-section. This turbulent movement is necessary to increase the heat, moisture and/or mass transfer rate. The second angle of inclination is preferably 50°-90°, and more preferably 60±10°.

Suitably, the channel has a first cross-section area $A_1$, and a second cross-section area $A_2$ at the flow director, wherein the ratio of area $A_1$ to area $A_2$, that is $A_1/A_2$, is greater than 1.5, preferably greater than 2.5, and more preferably greater than 3. The magnitude of the ratio, $A_1/A_2$, is essential for obtaining the velocity required for creating the desired turbulent movement of the fluid in the channel, and thus for increasing the heat, moisture and/or mass transfer rate.

In a preferred embodiment according to the invention the intermediate portion remains on an inward side of said channel wall from which the upstream portion deviates. This in order to further decrease the pressure drop.

The channel may comprise at least one flow director, which is mirror-inverted in relation to said flow director. Such a mirror-inverted flow director increases the heat, moisture and/or mass transfer rate in a whole system, when several channels are arranged to each other.

According to a preferred embodiment of the invention the cross-section of said channel may be top-shaped and preferably triangular. From the viewpoint of manufacture such a shape is preferable. Especially, an equilateral triangular cross-section minimises the friction losses along the channel walls in relation to the unit area and thus gives maximum flow rate per unit area. Therefore, for increasing the heat, moisture and/or mass transfer rate, an equilateral triangular cross-section is preferable.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

Other objectives, features and advantages of the present invention will appear from the following detailed disclosure, from the attached dependent claims as well as from the drawings.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements.

DESCRIPTION OF PREFERRED EMBODIMENTS

The present invention will be described in more detail below with reference to the accompanying schematic drawings, which for the purpose of illustration show a currently preferred embodiment.

Figure 1:
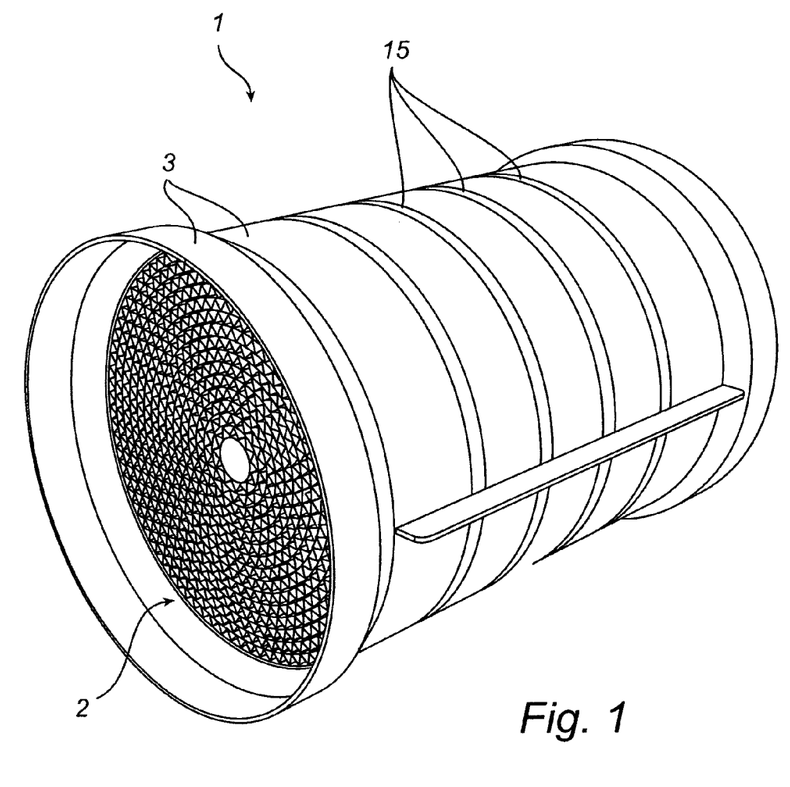
FIG. 1 illustrates a roll in a perspective view according to the present invention.

FIG. 1 illustrates a roll 1 with a channel system 2 according to the present invention. The roll 1 may be used for example as a catalyst, in a heat exchanger, such as a heat wheel, a gas-cooled nuclear reactor, a gas turbine blade cooling, or any other suitable application.

A corrugated strip 13 together with at least one flat strip 14, which forms channels 4, (see FIG. 6) are rolled up to an desired diameter to form a cylinder, which will constitute the actual core in the channel system 2 of the roll 1. Indentations 15 in the corrugated strip 13 and the essentially flat strip 14 (see FIG. 6) prevent telescoping of the roll that is formed, that is they prevent the different layers of strips 12 and 13 from being displaced relative to each other. In addition, a casing 3 surrounds the channel system 2, holds the channel system 2 together and fastens it in the adjacent construction.

Figure 6:
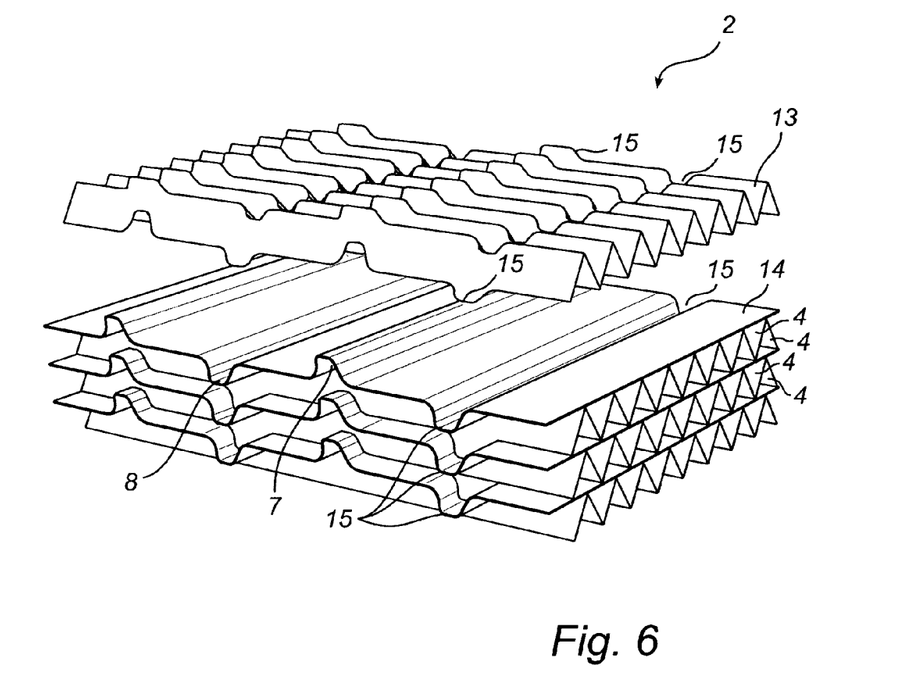
FIG. 6 illustrates a layer with channels in the longitudinal direction of the channels.

Alternatively, a number of corrugated strips 13 and flat strips 14 are arranged in layers by turns to form channels 4 (see FIG. 6). This arrangement is suitable for instance for plate heat exchangers.

Figure 2:
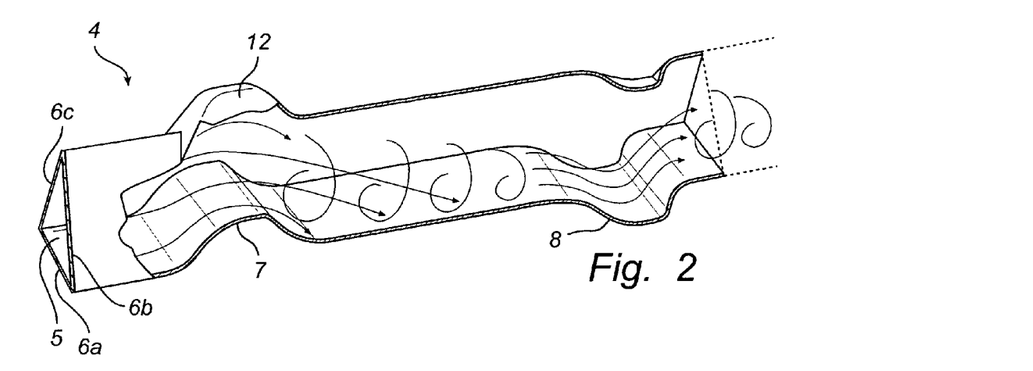
FIG. 2 is a perspective view of a partially opened channel in a channel system according to the present invention.

FIG. 2 shows a channel 4 in perspective and partially opened with a first flow director 7 and a second, in relation to the first flow director 7, mirror inverted flow director 8. However, more than one of each flow directors 7, 8 may be distributed along the whole length of the channel 4. It is possible to arrange the different types of flow directors not only alternatively, as in FIG. 2, but also indiscriminately. Alternatively, only one of the two types of flow directors may be used. In this case, also, the directors are distributed along the whole length of the channel 4. The flow directors 7, 8 direct the fluid, which is introduced through the inlet 5, in a predetermined direction.

The channel 4 is a channel of small dimension i.e. it is normally less than 4 mm in height. Preferably, the height H, see FIG. 3, of a channel is from 1 mm to 3.5 mm. The channel 4 has an equilateral triangular cross-section with channel walls 6a, 6b, 6c, which may be less than 5 mm. However, the form of the cross-section is not limited to an equilateral triangular, it may take any shape suitable for this application. The number of channel walls is not limited to three; it may be any suitable number. Further, in the fluid flow direction, the channel walls 6a, 6b, 6c encloses the channel 4, resulting in that the fluid may not flow from one channel 4 to another. On the other hand, the invention is not limited to channels enclosed by channel walls; a channel wall 6 may also partly enclose the channel 4, so that the fluid may flow from one channel 4 to another.

Length of the channel 4 may vary depending on the application. For instance, for catalysts the length of the channel 4 may be 150-200 mm, and for heat exchangers the length of the channel 4 may be 150-250 mm. However, the invention is not limited to these channel lengths. Also, it is possible to arrange an arbitrary number of channel systems 2 one after another in order to form a system with a required length.

Further, the channel 4 may take any axial direction. That is, the invention is not limited to horizontal channels.

The first flow director 7 is arranged on one channel wall 6a of the channel 4 so that the fluid flow (arrows) from the inlet 5 is directed towards the two other channel sides 6b, 6c. On the opposite side of the first flow director 7 is a bulge 12. By using flow directors 7, 8 with a special geometry, which are arranged at predetermined distance from each other and from the inlet 5 of the channel 4 an optimal relation between heat, moisture and/or mass transfer rate and pressure drop is obtained.

Precisely after passing the inlet 5, the fluid flow has an inlet turbulence. The turbulence decreases as the fluid is flowing through the channel, which results in a laminar fluid flow, with a constant velocity, inside the channel 4. When the fluid approaches the first fluid director 7 the velocity increases locally depending on the reduced cross-section. After passing the first fluid director 7 an eddy is created, i.e. a controlled turbulent movement of the fluid, due to the expanding cross-section and the velocity of the fluid. The fluid director 7 affects a major part of the fluid flowing through the channel 4, resulting in a mixing of the flow layers of the fluid. This turbulent movement is necessary to increase the heat, moisture and/or mass transfer rate.

Figure 3:
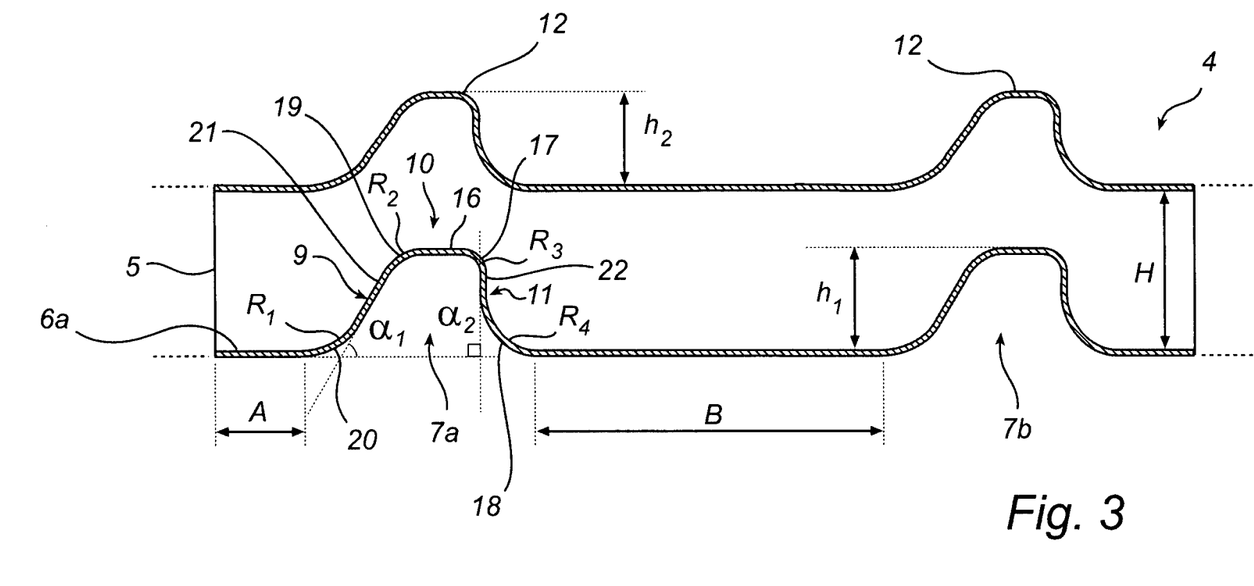
FIG. 3 is a cross-section of a channel in an alternative embodiment.

In FIG. 3 flow directors 7a, 7b of the same type are arranged next to each other. The flow directors 7, which extend inwardly into the channel 4, have an upstream portion 9, an intermediate portion 10, and a downstream portion 11. The flow directors 7a, 7b have a height $h_1$. The first fluid director 7a is arranged at a distance A from the inlet 5. The optimal placement of the first flow director 7a is dependent on current operating conditions.

The upstream portion 9 comprises a flat part 21, which deviates, in the fluid flow direction, at a predetermined first angle of inclination $\alpha_1$ in relation to the plane of the channel wall 6a. The first angle of inclination $\alpha_1$ is defined as the angle between the plane of the channel wall 6a and an extension of the flat part 21 to the plane of the channel wall 6a, which angle is located downstream of the intersection point of the extension of the flat part 21 and the plane of the channel wall 6a. The first angle of inclination $\alpha_1$ is also defined as the angle $\alpha_1$ in FIG. 3. Further, the first angle of inclination $\alpha_1$, is 10°-60°, and preferably 30°-50°.

The inclination of the upstream portion 9 increases the velocity of the fluid and directs the fluid towards the other surfaces, so that a controlled turbulent movement is initiated in order to increase the heat, moisture and/or mass transfer.

The intermediate portion 10 is arranged between the upstream portion 9 and the downstream portion 11. The intermediate portion 10 remains on the inward side of the channel wall 6 from which the upstream portion 9 extends. Alternatively, the intermediate portion 10 may be in both the inward and outward side of the channel wall 6.

Between the intermediate portion 10 and the upstream portion 9 is arranged a curved transition 19 with a predetermined radius $R_2$. The radius $R_2$ of the transition 19 between the upstream portion 9 and the intermediate portion 10 is 0.1-2 times the height of the flow director 7, i.e. $0.1*h_1-2*h_1$. This, in order to smoothly direct the fluid flow towards a direction parallel to one side of the channel after passing the upstream portion. For the embodiment with smallest preferred channel height H, that equals 0.04-1.08 mm. For the embodiment with largest preferred channel height H, that equals 0.14-4.31 mm.

The intermediate portion 10 comprises a flat part 16, which is parallel to one channel wall 6a of the channel 4 and small relative to the lengths of the upstream 9 and downstream portions 11. Also, the maximum height $h_1$ of the flow director 7, in relation to the channel wall 6 from which the flow director 7 extends, is at the flat part 16 of the intermediate portion 10. The height $h_1$ is preferably larger than 0.35 times the height H of the channel 4. For the embodiment with smallest preferred channel height H, that equals 0.35-0.54 mm. For the embodiment with largest preferred channel height H, that equals 1.40-2.15 mm. The flat part 16 may be there for production reasons, however it also helps to direct the fluid to flow in the direction of the channel 4, i.e. parallel to the channel walls 6a, 6b, 6c of the channel 4, after being directed towards the opposite walls 6b, 6c by the upstream portion 9. The flat part 16 may have a length in the fluid flow direction of 0-2*H, preferably $0-2.0*h_1$, and more preferably $0-1.0*h_1$. Instead of being parallel to the channel wall 6 from which the upstream portion 9 extends, the flat part 16 of the intermediate portion 10 may have an inclination in relation to the channel wall 6a from which the upstream portion 9 extends. The inclination may be, in the fluid flow direction, both inwardly into the channel 4 or towards the channel wall 6a. In another embodiment the intermediate portion 10 may have a slightly curved shape, for instance convex. The transitions 17, 19 do not have to be curved they may be direct.

The downstream portion 11 of the flow director 7 comprises a flat part 22, which returns, in fluid flow direction, to the channel wall 6a with a predetermined second angle of inclination $\alpha_2$ in relation to the plane of the channel wall 6a. The second angle of inclination $\alpha_2$ is defined as the angle between the plane of the channel wall 6a and an extension of the flat part 22 to the plane of the channel wall 6a, which angle is located upstream of the intersection point of the extension of the flat part 22 and the plane of the channel wall 6a. The second angle of inclination $\alpha_2$ is also defined as the angle $\alpha_2$ in FIG. 3. Further, the second angle of inclination $\alpha_2$, is 50°-90°, and preferably 60±10°. Preferably, the flat part 22 is short enough, so the downstream portion 11 may return to the channel wall 6a in an even transition 18, preferably with a large radius $R_4$. The flat part 22 allows the fluid to create a controlled turbulent movement, due to the expanding cross-section, which optimises the ratio between heat, moisture and/or mass transfer and pressure drop.

The predetermined radius $R_3$ of the transition 17 between said intermediate portion 11 and said downstream portion, is 0.1-2.1 times the height of the flow director 7, i.e. $0.1*h_1-2.1*h_1$, preferably 0.35-2.1 times the height of the flow director 7, i.e. $0.35*h_1-2.1*h_1$, and more preferably 0.35-1.1 times the height of the flow director 7, i.e. $0.35*h_1-1.1*h_1$ For the embodiment with smallest preferred channel height H, that equals 0.04-1.13 mm, 0.12-1.13 mm, and 0.12-0.59 mm, respectively. For the embodiment with largest preferred channel height H, that equals 0.14-4.52 mm, 0.49-4.52 mm, and 0.49-2.37 mm, respectively. This radius directs a major part of the fluid towards the channel wall 6a creating an eddy, i.e. a controlled turbulent movement of the fluid, which is created due to the expanding cross-section. This turbulent movement is necessary to increase the heat, moisture and/or mass transfer rate.

Alternatively, said radius $R_2$ of the transition 19 between said upstream portion 9 and said intermediate portion 10 may be equal to the radius $R_3$ of the transition 17 between said intermediate portion 10 and said downstream portion 11. That is, 0.1-2.1 times the height of the flow director 7, i.e. $0.1*h_1-2.1*h_1$, preferably 0.35-2.1 times the height of the flow director 7, i.e. $0.35*h_1-2.1*h_1$, and more preferably 0.35-1.1 times the height of the flow director 7, i.e. $0.35*h_1-1.1*h_1$. For the embodiment with smallest preferred channel height H, that equals 0.04-1.13 mm, 0.12-1.13 mm, and 0.12-0.59 mm, respectively. For the embodiment with largest preferred channel height H, that equals 0.14-4.52 mm, 0.49-4.52 mm, and 0.49-2.37 mm, respectively. Equal radii are advantageous in some applications in which the fluid may flow also in a direction opposite to the aforementioned fluid flow direction.

Between the channel wall 6a of the channel 4 and the upstream portion 9 is a smooth transition 20, having a predetermined radius, $R_1$. The radius $R_1$ of the transition 20 between the channel wall 6a of the channel 4 and the upstream portion 9 helps to direct the fluid upwards into the channel 4 and is 0.1-2 times the height $h_1$ of the flow director 7, i.e. $0.1*h_1-2*h_1$. For the embodiment with smallest preferred channel height H, that equals 0.04-1.08 mm. For the embodiment with largest preferred channel height H, that equals 0.14-4.31 mm.

The optimal radii $R_1$ and $R_2$, of the transitions between the channel wall 6a and the upstream portion 9, and between the upstream portion 9 and the intermediate portion 10, respectively, regarding the ratio of pressure drop to heat, moisture and/or mass transfer, may be determined by using some empirical parameters. Such parameters are for instance the ratio of cross-section area $A_1$ of the channel 4 and the cross-section area $A_2$ of the channel 4 at a flow director 7, 8, the ratio of the variation of the cross-section area of the channel 4 at a flow director 7, 8, to the cross-section area $A_1$, and the first and second inclination angles $\alpha_1$, $\alpha_2$, of the upstream 9 and downstream portions 11, respectively. The cross-section area $A_1$ of the channel 4 is defined as the cross-section at the inlet 5 of the channel 4. The cross-section area $A_1$ of the channel 4 is also defined as $A_1$ in FIG. 5. The cross-section area $A_2$ of the channel 4 at the flow director 7, 8, is defined as the cross-section area at the intermediate portion 10 at height $h_1$. The cross-section area $A_2$ of the channel 4 is also defined as $A_2$ in FIG. 5. In case of an intermediate portion, which is not parallel with the channel wall 6 from which the upstream portion 9 extends, the cross-section area $A_2$ is defined as the average cross-section area at the intermediate portion 10.

Between the downstream portion 11 and the channel wall 6a of the channel 4 is a smooth transition 18 having a radius $R_4$. The radius $R_4$ of the transition 18 between the downstream portion 11 and the channel wall 6a of the channel 4, reduces formation of a secondary eddy, which otherwise may increase the pressure drop. The radius $R_4$ is 0.2-2 times the height of the flow director 7, i.e. $0.2*h_1$-$2*h_1$, and preferably 0.5-1.5 times the height of the flow director 7, i.e. $0.5*h_1$-$1.5*h_1$. For the embodiment with smallest preferred channel height H, that equals 0.01-2.15 mm and 0.18-0.81 mm, respectively. For the embodiment with largest preferred channel height H, that equals 0.03-8.62 mm and 0.70-3.23 mm, respectively. However, the transitions 18, 20 are not limited to having a radius, they may be direct.

The smooth transitions 18, 19, 20, 21 results in a smoother fluid flow over the flow director 7 and at the same time the transitions direct the fluid in a certain direction. The smooth transitions also decrease the pressure drop, since the pressure drop is established by the friction between the fluid and the walls of the channel.

In FIGS. 2 and 3, the upstream portion 9 the flow director has a flat part 21. In another embodiment, which is not shown, the upstream portion 9 may comprise two against each other curved portions without a flat part in between them. That is, the upstream portion 9 may be formed by the concave transition 20 between the channel wall 6a and the upstream portion continuing in the convex transition 19 between the upstream portion 9 and the intermediate portion 10. In this case the first angle of inclination $\alpha_1$ refers to the angle between the tangent through the inflection point, seen in cross-section, of the two curved portions and the plane of the channel wall 6. In other aspects, the first angle of inclination is defined similarly to the case with the flat part 21.

In another embodiment the downstream portion 11 may have a concave or convex shape or the downstream portion 11 may comprise two against each other curved portions without a flat part 22 in between them. That is, the upstream portion 11 may be formed by a convex transition 17 between the intermediate portion and the downstream portion continuing in a concave transition 18 between the downstream portion and the channel wall. In this case, the second angle of inclination $\alpha_2$ refers to the angle between the tangent through the inflection point, seen in cross-section, of the two curved portions and the plane of the channel wall 6a. In other aspects, the second angle of inclination is defined similarly to the case with the flat part 22.

In FIG. 3 a second flow director 7b is lying at a distance B from the first flow director 7a, which second flow director 7b has the same geometrical shape as the flow director 7a. The second flow director 7b may also have a different geometrical shape compared to the geometrical shape of the first flow director 7a. The distance B should be large enough, so the turbulent movement created after passing the first flow director 7a may be maximally utilised and that the fluid may take the direction of the channel 4, i.e. parallel to the channel 4 channel walls 6a-c. Through this distance unnecessary pressure drop is prevented without any decrease in heat, moisture, and/or mass transfer rate. The invention is not limited to having flow directors at equal distances B from each other. On the contrary, it is possible to arrange the flow directors at arbitrary distances from each other.

Above the flow director 7a, 7b is a bulge 12 arranged. Preferably, the height $h_2$ of the bulge 12 is less than the height $h_1$ of the flow director 7. This reduces unnecessary turbulence in the bulge 12. Further preferably, the bulge 12 has a shape that fits well in the corresponding bulge 12, which is defined by the flow director on the underside of a second channel (see FIG. 4). The height of the bulge 12 is preferably so high that a stable assembly is obtained when arranging channels in layers, this in order to prevent telescoping. Here, telescoping refers to undesired movement of the channel layers in relation to each other. The invention is not limited to having one bulge at each flow director 7. Instead, there may for instance be one bulge, in fluid flow direction, at the first flow director 7 and one at the last flow director 7.

Figure 4:
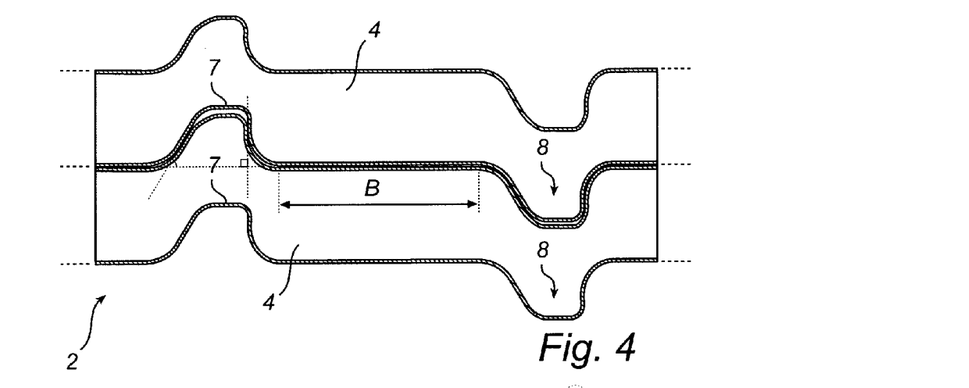
FIG. 4 is a cross-section of two channels in FIG. 2 arranged on top of each other.

FIG. 4 shows two channels 4 arranged on each other, as in a channel system 2, each with a first flow director 7 and a second mirror-inverted flow director 8 to the first flow director 7. If only flow directors, which extend into the channel are used, only half of the channels will have flow directors when they are rolled up together or arranged upon each other as in FIG. 6. In order to further increase the heat, moisture and/or mass transfer it is suitable that each second flow director is a mirror-inverted flow director 8 to the first flow director 7 so that all channels are provided with flow directors. The second mirror inverted flow director 8 to the first flow director 7 is positioned at a predetermined distance B from the first flow director 7. The distance B should be so large that the turbulent movement created after passing the first flow director 7 may be maximally utilised and that the fluid may take the direction of the channel 4, i.e. parallel to the channel 4 channel walls 6. The fluid which is getting closer to the second mirror-inverted flow director gets a large expansion area and the velocity decreases locally.

Figure 5:
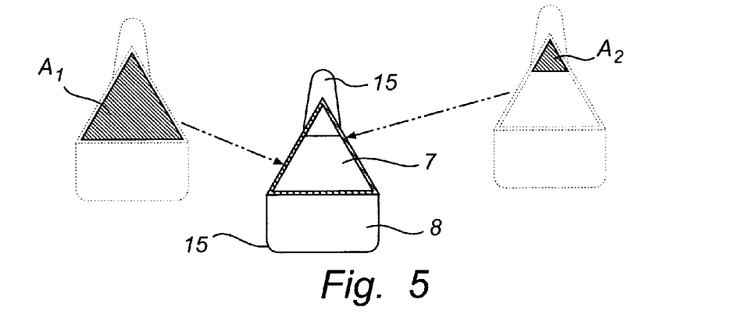
FIG. 5 is a cross-section of the channel in FIG. 2 seen from one end of the channel.

FIG. 5, a cross-section of the channel in FIG. 2 seen from one end of the channel, illustrates how the cross-section is affected by the indentations 15 from both sides. Both the first flow director 7 and the mirror-inverted flow director 8 are indicated in the figure and they extend over the whole channel wall 6a (see also FIG. 1). The cross-section off the channel is triangular, but any top-shaped cross-section is suitable. Thus, also a trapezoidal cross-section is feasible.

In order to create the desired turbulent movement, a certain velocity $v_2$ of the fluid, at the intermediate portion 10 of the flow director 7 is necessary. The velocity $v_2$ depends on the cross-section area $A_2$ of the channel at the intermediate portion 10, the cross-section area $A_1$ of the channel 4 and the velocity, $v_1$, in the part of the channel with the cross-section area $A_1$, for instance at the inlet of the channel. By using the formula $A_2 = A_1 * (v_1)^2 / v_2$, the most advantageous ratio of area $A_1$ to area $A_2$, that is $A_2/A_1$, may be calculated depending on the application. The ratio of area $A_1$ to area $A_2$ is greater than 1.5, preferably greater than 2.5, and more preferably greater than 3.

According to an alternative of the present invention, the flow director is arranged in such a manner that the intermediate portion between said upstream and downstream portions is parallel to a side of the triangle of the triangular cross-section of the channel, from which side the flow director extends. In another alternative, the flow director is arranged in such a manner that the intermediate portion between said upstream and downstream portions is perpendicular to one of the sides of the triangle of the triangular cross-section of the channel. This means that the upstream and downstream portions respectively, have an inclination relatively to two sides of the channel, not only the side from which the flow director deviate but also a neighbouring side. In still an alternative embodiment, the flow director may be arranged in such a manner that side portions of the intermediate portion have an inclination relative to the side from which the flow director deviate, i.e. the flow director forms a convex surface with four inclined sides. Alternatively, one flow director may extend from one channel wall 6a and return to another channel wall 6b, or the flow directors may extend and return to different channel walls 6a-c in an arbitrary order. For instance, every third flow director may extend from the channel wall 6a and the flow directors between those from channel wall 6a may extend from the two remaining channel walls 6b, c in turns. In yet an alternative embodiment, the flow directors may extend from two or several channel walls 6a-c at the same distance from the inlet of the channel 4 or from a flow director 7, 8 upstream in the channel. This results in a narrowing of the channel from several walls. This type of flow directors may be combined with the flow directors 7, 8 illustrated in the figures.

FIG. 6 illustrates a layer with channels 4 in a channel system 2 in the longitudinal direction of the channels according to the present invention. A corrugated strip 13 is preferably used, in which flow directors 7, 8 are pressed from one side so as to form both indentations 15 at the fold edges and pressed-out portions at the inner fold edges. The indentations 15 are here the same as the flow directors 7, 8 explained above. In this embodiment, also a substantially flat strip 14 is used, which is also formed with indentations 15 corresponding to those in the corrugated strip 13. The flat strip 14 and the corrugated strip 13 are pressed one on top of the other so that the indentations in the flat strip 14 fits into the indentations 15 in the corrugated strip 13.

In order to additionally increase the heat, moisture and/or mass transfer, it is convenient that the channels with a tip of the cross-sectional triangle pointing downward and the channels with a tip of the cross-sectional triangle pointing upward are provided with indentations/pressed-out portions, resulting in that all channels are provided with flow directors. For all channels to be provided with flow directors, it is therefore convenient to make indentations/pressed-out portions from both sides, so that the base of the triangle, that is the cross-section of the channel, is pressed inward, thereby achieving a reduction of the cross-sectional area. The indentations/pressed-out portions of the channels with the tip of the triangular cross-section pointing outwardly and inwardly, respectively, are offset relative to each other along the channels, and preferably equidistantly spaced from each other. In a cross-section of one and the same channel at different points along the same, there are thus indentations of the base of the triangle/pressed-out portion of the tip of the triangle and indentations of the tip of the triangle/pressed-out portion of the base of the triangle. It is mainly a reduction of the cross-sectional area that helps to generate turbulence. This means that the portions where the base is pressed inward toward the centre of the channel generate most of the turbulence since this is where the cross-sectional area is reduced. At the portions where the tip of the triangle is pressed inward towards the centre of the channel and the base is pressed outward, there is an increase of the cross-sectional area instead.

Although the invention above has been described in connection with preferred embodiments of the invention, it will be evident for a person skilled in the art that several modifications are conceivable without departing from the invention as defined by the following claims. For example, as described above, the corrugated strip can be corrugated in other ways so that other channel profiles are obtained. If the configuration of the flow directors does not constitute an obstacle to telescoping, for example if the angles of the upstream and downstream portions are small relative to the longitudinal direction of the channel, it is possible to make a special indentation/pressed-out portion with slightly less acute angles relative to the longitudinal direction of the channels. These telescoping obstacles should then be small, that is small relative to the cross-section of the channels, compared with the flow directors in order to minimise the pressure drop. These telescoping obstacles may, of course, also supplement flow directors, which already serve as telescoping obstacles. The number of indentations/flow directors depends on the length of the channel and the cross-section area $A_1$ of the channel. To optimise the ratio of pressure drop to heat, moisture and/or mass transfer, a channel with smaller cross-section area requires shorter distance between the flow directors and hence more flow directors than a channel with a larger cross-section area. Also, from the viewpoint of manufacture it is suitable with a predetermined distance that is reusable for different applications. For the preferred embodiments the number of flow directors may be 5-6 for a channel of length 150 mm. However, the number of flow directors is in no way limited to this number.

The invention claimed is:

1. Channel system for optimising a relation between pressure drop and heat, moisture and/or mass transfer of fluids flowing through said system, said channel system comprising:
at least one channel including at least one channel wall and at least one flow director having a height, said at least one flow director extending in a fluid flow direction and transversely to said at least one channel, the at least one flow director including,
an upstream portion,
a downstream portion,
an intermediate portion between said upstream and downstream portions, said upstream portion deviating, in said fluid flow direction, from said at least one channel wall inwardly into said at least one channel, and said downstream portion returning, in said fluid flow direction, towards said at least one channel wall, and
a transition, between said intermediate portion and said downstream portion, said transition being curved with a radius, wherein
said radius is smaller than 4.52 mm, and between $0.35*h_1$ and $2.1*h_1$, $h_1$ being the height of the at least one flow director,
a flat part of said upstream portion forms a first angle of inclination in relation to a plane of said at least one channel wall from which said upstream portion deviates,
a flat part of said downstream portion forms a second angle of inclination in relation to said plane of said at least one channel wall to which said downstream portion returns, the first angle of inclination and the second angle of inclination being measured in a respective direction away from said at least one channel, the first angle of inclination being smaller than the second angle of inclination such that a rate of change in cross sectional area over the flat part of the upstream portion is smaller than a rate of change in cross sectional area over the flat part of the downstream portion,
the at least one channel has a triangular cross section and a height of between 1 mm and 4 mm, to ensure a laminar flow through said channel system, and said at least one flow director creates an eddy that begins after the transition, between the intermediate portion and the downstream portion due to the rate of change in cross sectional area over the flat part of the downstream portion and dissipates into the laminar flow at a location beyond the at least one flow director.

2. Channel system according to claim 1, wherein said height of said at least one flow director is larger than 0.35 times a height of said at least one channel, taken in a similar direction as the height of said at least one flow director.

3. Channel system according to claim 2, wherein said intermediate portion comprises a flat portion, which is substantially parallel to said at least one channel wall of said at least one channel.

4. Channel system according to claim 3, wherein H is the height of the at least one channel, and wherein said flat portion has a length, in said fluid flow direction, greater than 0 but not greater than 2*H.

5. Channel system according to claim 3, wherein said flat portion has a length, in said fluid flow direction greater than 0 but not greater than $2*h_1$.

6. Channel system according to claim 3, wherein said flat portion has a length, in said fluid flow direction greater than 0 but not greater than $1.0*h_1$.

7. Channel system according to claim 1, wherein a transition between said downstream portion and said at least one channel wall is curved with a radius.

8. Channel system according to claim 7, wherein said radius of said transition between said downstream portion and said at least one channel wall is between $0.2*h_1$ and $2*h_1$.

9. Channel system according to claim 7, wherein said radius of said transition between said downstream portion and said at least one channel wall is between $0.5*h_1$ and $1.5*h_1$.

10. Channel system according to claim 1, wherein a transition between said upstream portion and said intermediate portion is curved with a radius.

11. Channel system according to claim 10, wherein said radius of said transition between said upstream portion and said intermediate portion is between $0.1*h_1$ and $2*h_1$.

12. Channel system according to claim 10, wherein said radius of said transition between said upstream portion and said intermediate portion is equal to said radius of said transition between said intermediate portion and said downstream portion.

13. Channel system according to claim 1, wherein a transition between said at least one channel wall of said at least one channel and said upstream portion of the flow director is curved with a radius.

14. Channel system according to claim 13, wherein said radius of said transition between said at least one channel wall of said at least one channel and said upstream portion is between $0.1*h_1$ and $2*h_1$, wherein $h_1$ is the height of the at least one flow director.

15. Channel system according to claim 1, wherein said first angle of inclination is between 10 and 60 degrees.

16. Channel system according to claim 1, wherein said second angle of inclination is between 50 and 90 degrees.

17. Channel system according to claim 16, wherein said second angle of inclination is 60 degrees, plus or minus 10 degrees.

18. Channel system according to claim 1, wherein said channel includes a first cross-section area $A_1$, and a second cross-section area $A_2$ at the flow director, wherein the ratio of area $A_1$ to area $A_2$, that is $A_1/A_2$, is greater than 1.5.

19. Channel system according to claim 1, wherein said intermediate portion remains on an inward side of said at least one channel wall from which said upstream portion deviates.

20. Channel system according to claim 1, wherein said at least one channel comprises at least one further flow director, which is mirror-inverted in relation to said at least one flow director.

21. Channel system according to claim 1, wherein said radius of said transition between said intermediate portion and said downstream portion is between $0.35*h_1$ and $1.1*h_1$.

22. Channel system according to claim 1, wherein said channel includes a first cross-section area $A_1$, and a second cross-section area $A_2$ at the flow director, wherein the ratio of area $A_1$ to area $A_2$, that is $A_1/A_2$, is greater than 2.5.

23. Channel system according to claim 1, wherein said channel includes a first cross-section area $A_1$, and a second cross-section area $A_2$ at the flow director, wherein the ratio of area $A_1$ to area $A_2$, that is $A_1/A_2$, is greater than 3.

* * * * *